United States Patent Office 3,244,399
Patented Apr. 5, 1966

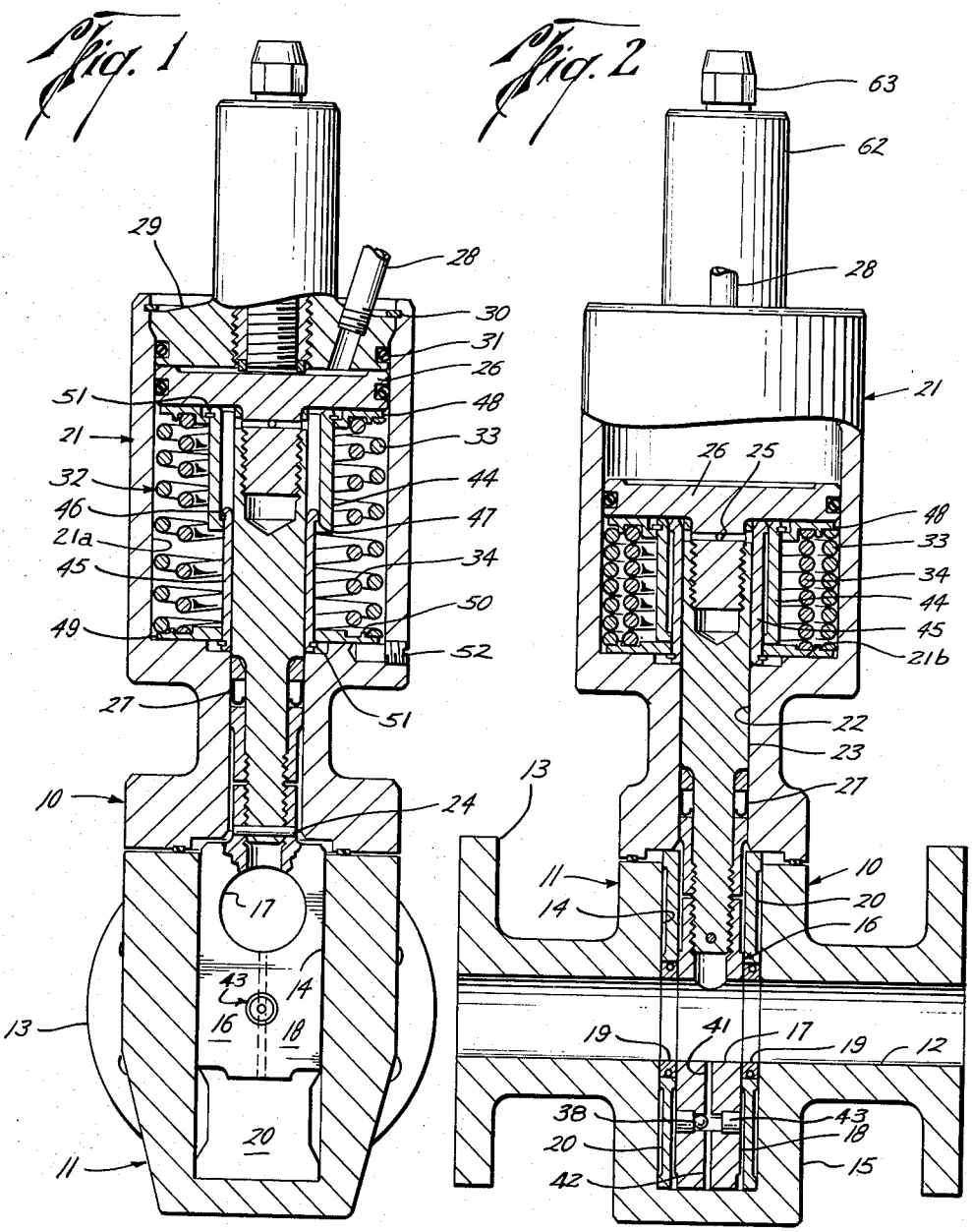

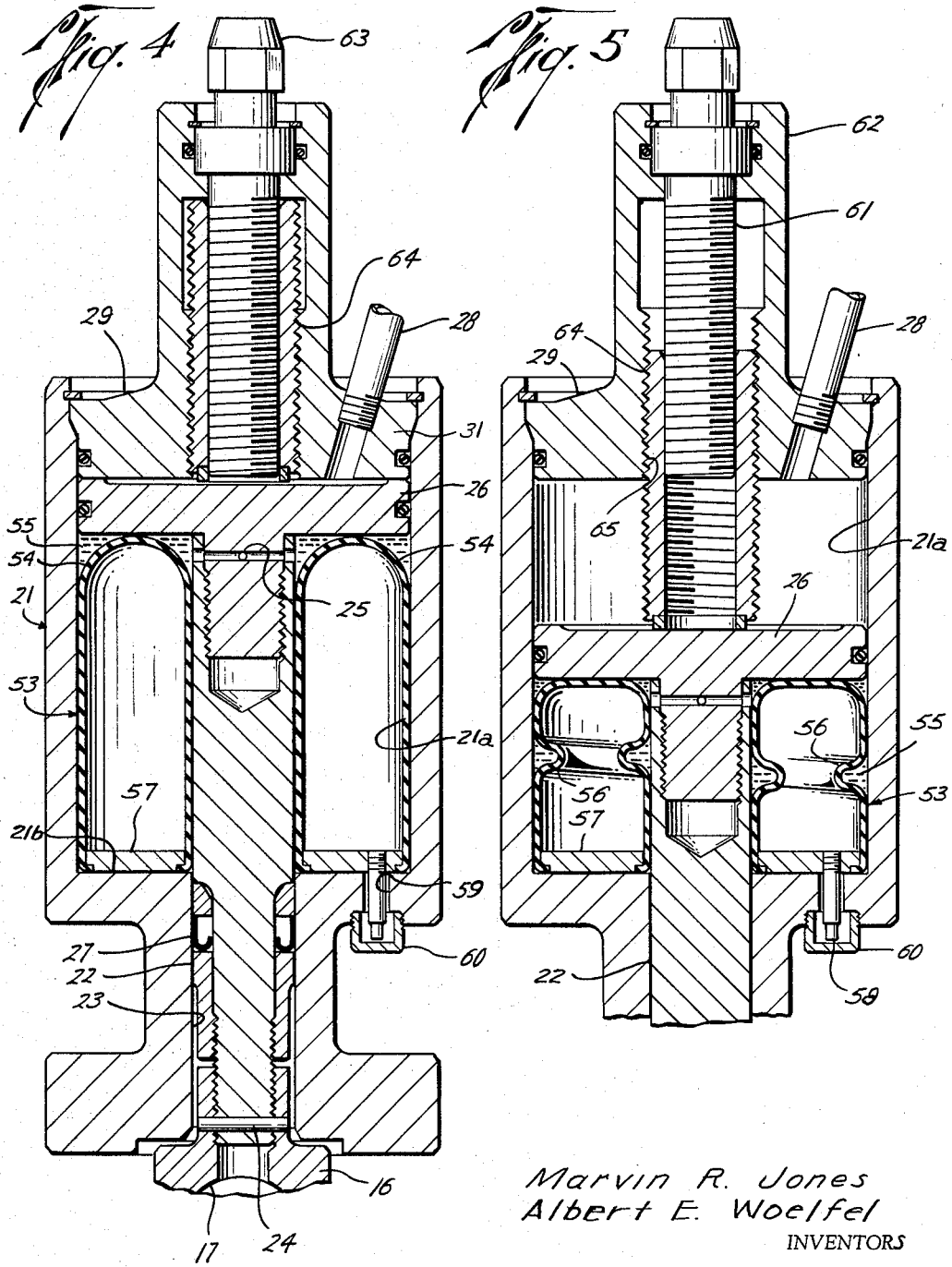

3,244,399
GATE VALVE
Marvin R. Jones and Albert E. Woelfel, Houston, Tex., assignors to Cameron Iron Works, Inc., Houston, Tex., a corporation of Texas
Filed Dec. 19, 1962, Ser. No. 245,923
2 Claims. (Cl. 251—327)

This invention relates to improvements in gate valves of the type in which the gate is urged to opened or closed position by means of line fluid pressure. In one of its aspects, it relates to improvements in the so-called "fail safe" valve of this type.

In certain types of automatic safety valves, movement of the gate to either position is initiated by a predetermined increase or decrease in the pressure of the line fluid. In the "fail safe" valve, closing movement of the gate is initiated by a decrease in an external force opposing such line fluid pressure. This force may be provided, for example, by fluid acting upon a piston connected to the stem of the gate and disposed within a bonnet on the valve body.

In either case, it has been the practice to connect the line fluid with a piston communicating with the cavity in which the gate is disposed. Such a piston may be on the stem of the gate or may be otherwise mechanically connected to the gate in order to transmit the force of the line fluid thereto. This presents no problem in valves of the type in which the gate seals only on its downstream side, because line fluid always has access to the body cavity. However, many applications require valves which can hold pressure from either direction, so that there is a seal on at least the upstream side of the gate during that portion of its movement in which a solid portion thereof is disposed across the flowway to close same. In many cases, the gate will seal on both sides, so that when the stem is of the "rising" type, and the aforementioned piston moves with it to change the volume of the body cavity, there may be a liquid lock during this same portion of gate movement.

An object of this invention is to provide a gate valve of this general type described in which the gate will move to the position toward which it is urged by line fluid even though it may seal on the upstream side during the portion of such movement above mentioned, and regardless of which side of the gate is upstream due to the predominant or higher line pressure thereon.

Another object is to provide such a gate valve in which upstream line pressure is admitted to the piston even during that portion of the movement of the gate to its line pressure urged position in which it sealably closes off the upstream side of the flowway.

A more particular object is to provide a gate valve of the character described in the foregoing object wherein such upstream line pressure is admitted to the body cavity by means of an auxiliary valving arrangement which is compact as well as easy to assemble, repair and replace.

Fail safe valves are particularly well suited for use in remote locations, because if the external force fails due to a break in the fluid lines, the valve will automatically close as long at the line fluid is at a certain predetermined pressure. In order to assure its closure, the line fluid pressure is normally supplemented by an auxiliary force opposing the force of hydraulic fluid acting on the stem piston.

In some prior fail safe valves, this auxiliary force has been provided by a heavy coil spring which is so compressed between the bonnet and piston on the gate stem as to insure movement of the gate to the desired position even in the absence of sufficient line pressure for this purpose. The necessity for compressing and decompressing this spring makes it dangerous and difficult to handle by experienced personnel during installation, and even more so by unskilled personnel during its repair and replacement. In other fail safe valves, the auxiliary force has been provided by means of pressure fluid from an accumulator connected to an expansible fluid chamber between the piston and bonnet. This has offered considerable problems from the standpoint of leakage, particularly about the gate stem and piston.

It is therefore still another object of the invention to provide a fail safe gate valve having a source of auxiliary closing force which is safe and easy to handle during installation and replacement and which offers no serious leakage problem.

Yet another object is to provide a fail safe gate valve in which the auxiliary force is provided by one or more coil springs which may be installed and removed without the necessity of compressing or decompressing them in the field.

Still a further object is to provide a fail safe gate valve in which the auxiliary force is provided by a "gas spring," and particularly one which is so arranged within the bonnet that its edges will not be pinched or otherwise damaged during reciprocation of the stem piston.

In the drawings, wherein like reference characters are used throughout to designate like parts:

FIG. 1 is a vertical sectional view of one embodiment of a fail safe gate valve constructed in accordance with the present invention, with the gate thereof in closed position and the section being taken along a plane transverse to the axis of the flowway through the valve body;

FIG. 2 is another vertical sectional view of the valve of FIG. 1, but with the gate in opened position and with the section being taken along a plane parallel to the axis of the flowway;

FIG. 3 is an enlarged sectional view of the auxiliary valving arrangement of the valve of FIGS. 1 and 2;

FIG. 4 is a vertical sectional view of the bonnet and upper end of the gate stem of another embodiment of fail safe gate valve constructed in accordance with the present invention, the stem being shown in a position it occupies in the closed position of the valve; and FIG. 5 is another vertical sectional view of the porion of the bonnet and gate stem shown in FIG. 4, but with the stem in the position it occupies when the valve is open.

With reference now to the details of the above-described drawings, the valve 10 shown in FIGS. 1 to 3 comprises a valve body 11 having a flowway 12 therethrough and flanges 13 at the opposite end of the flowway for connecting the valve body in a flow line. The flowway 12 is intersected intermediate its opposite ends by a cavity 14 which extends through the open upper end of the valve body and downwardly into the lower end 15 thereof. A gate 16 is reciprocable within the cavity between a lowered position within the well to open the flowway (FIG. 2) and a raised position to close same (FIG. 1). For this purpose, the gate 16 has a port 17 therethrough which is alignable with the flowway 12 in the open position of the valve and a solid portion 18 beneath the port which is disposed across the flowway in the closed position of the valve.

The opposite sides of the gate are parallel and slide closely between annular seats 19 which are held by means of plates 20 between the sides of the gate and the portions of the body cavity surrounding the flowway.

More particularly, it is contemplated that these seats may be urged by upstream line pressure or other means against the solid portion 18 of the gate to form a seal on the upstream or both sides thereof in the closed position of the valve (FIG. 1).

The operator for the gate is contained within a bonnet 21 having a lower end sealably connected to the upper end of the valve body 11 in any suitable manner. When the bonnet is so connected, it provides a cylinder 21a connected with the body cavity 14 by means of an opening 22 extending through its lower end. A stem 23 releasably connected to the upper end of the gate 16 by a pin 24 extends upwardly through the opening 22 for threaded connection to a piston 26 which is sealably slidable within the cylinder 21a. The stem and piston are held against disengagement by a pin 25 extending through them. A piston comprising a seal ring 27 carried about a mid portion of the stem is sealably slidable within the opening 22 and communicates with fluid within the body cavity so as to urge the gate upwardly toward its closed position.

The open upper end of the cylinder 21a is closed by a cover 29 releasably connected thereto by a snap ring 30 and sealed with respect thereto by a seal ring 31 carried in its outer periphery. Thus, there is a first expansible chamber within the bonnet above the piston 26 and a second expansible chamber therein between the lower side of the piston and the bottom wall 21b of the cylinder. The gate is normally held in its open position by means of a fluid which is introduced into the upper chamber of the bonnet from any suitable external source through the tubing 28. The force of this fluid is opposed not only by the force of line fluid upon piston 27, but also the force of cartridge 32 containing precompressed coil springs 33 and 34 within the lower expansible chamber of the bonnet.

As previously described, the fluid from the external source is normally pressured to an extent sufficient to overcome the effect of line pressure upon stem piston 27 as well as the effect of the cartridge 32 so as to move the piston downwardly to the FIG. 2 position and thereby maintain the valve in open position. However, in the event of a failure of the external source, such as might occur upon a break in the tubing 28, the line pressure will ordinarily be effective to urge the gate upwardly to the position of FIG. 1 and thereby close the valve. In the event the line fluid is at a sufficiently low pressure that it will not alone overcome the friction of the gate stem within the opening 22, the springs 33 and 34 provide an auxiliary force for this purpose. Thus, as will also be described more fully hereinafter, even in their expanded position of FIG. 1, the springs are still compressed sufficiently to supplement the closing force on the stem piston.

When the seats 19 are adapted to seal against the gate only when the gate is closed (FIG. 1) and during that portion of the movement of the gate, during final closing and initial opening, in which the solid portion of the gate is disposed across the flowway to close same, the pressure within the body cavity, and thus effective over stem piston 27, is normally that of the line fluid. However, in a manner to be described below and in accordance with one novel aspect of this invention, upstream line pressure is admitted to the body cavity during this portion of the closing movement of the gate so that there is at all times a gate closing force due to line fluid and it is only necessary that the cartridge 32 supplement same when this pressure is low. In fact, since this upstream line pressure is usually greater than the line pressure while the valve is open, the closing force on the piston 27 will be greatest when the force due to the coil springs 33 and 34 is least.

For the above-described purpose, there are passageways 35 and 36 in the gate connecting at their outer ends with opposite sides thereof. More particularly, such passageways intersect the sides of the gate within the solid portion 18 thereof so as to connect with the flowway 12 on each side of the gate during the above-mentioned portion of closing movement of the gate. As best shown in FIG. 3, the inner ends of the passageways 35 and 36 connect with a cylindrical valve chamber 37 in which a ball-shaped valve member 38 is closely received for shifting laterally between positions seated upon a seat 39 at the intersection of passageway 35 with the valve chamber and seat 40 at the intersection of passageway 36 with the same valve chamber. A first vertically extending passageway 41 connects the valve chamber 37 with the port 17 through the gate, while a second such passageway 42 connects the chamber with the lower end of the gate.

Since the ball 38 fits closely within the chamber 37, it will be understood that when the gate begins that portion of its movement in which the solid portion 18 is disposed over the flowway to close same, upstream pressure on one side of the gate will flow through the passageway connecting with such side and force the ball 38 against the seat of the other passageway. Thus, although the flowway is maintained closed, upstream pressure is admitted upwardly through the passageway 41 into the body cavity communicating with the stem piston seal 27. In this respect, it will also be understood that line fluid entering the port 17 through the passageway 41 has free access to the piston 27 within the cavity inasmuch as the sides of the gate above such port do not seal with respect to the carriers 20. The passageway 42 insures against closure of communication between the cavity and flowway by seating of the ball 38 across the intersection of passageway 41 with the valve chamber. This same passageway 42 also provides a means of access to the piston 27 inasmuch as line fluid flowing out of the passageway 42 is free to move up each opposite side of the gate intermediate the carriers 20. Thus, it is contemplated that the carriers may in fact seal with opposite sides of the gate above the port 17. Obviously, still further arrangements for admitting line pressure to the piston 27 may be employed.

Since the stem 23 rises and falls with the gate as the gate is moved between opened and closed positions, the piston seal 27 will cause the body cavity to expand and contract during that portion of gate movement in which it closes the flowway on both sides. As previously mentioned, this could cause the liquid within the cavity to lock the gate in the absence of some means for relieving the liquid in the chamber during this interval. As will be apparent from the foregoing description, however, the passageway 41 cooperates with the valve chamber 37 to insure free passage of such liquid into the flowway during this expansion and contraction, thereby preventing any liquid locks.

The disposal of this auxiliary valve means within the gate not only provides a compact arrangement, but also facilitates replacement and repair since it merely entails removal of the gate. Preferably, each passageway 35 and 36 is formed within an insert 43 having an outer body 43a for abutment at its inner end with a shoulder 43b on the gate and having the seat 39 or 40 for the ball 38 formed thereon. The passageway is bored through an inner body 43c which is in turn fitted within and shouldered against body 43a.

The spring cartridge 32 includes an outer cylindrical member 44 and an inner cylindrical member 45 telescopically arranged and slidable axially of one another between the expanded position of FIG. 1 and the collapsed position of FIG. 2. The coil springs 33 and 34 are held in a precompressed state by means of flange 48 connected to the outer member 44 and flange 49 connected to the inner member 45, so that the carridge 32 may be installed and removed as a unit, thereby eliminating the dangers involved in compressing and decompressing the springs in the field.

In their expanded position, the cylindrical members are held against further axial movement away from one another by means of abutting shoulders 46 and 47. In this latter position, the piston 26 has been moved upwardly to its fullest extent so as to move the gate 16 to fully closed position, and the coil springs 33 and 34 will be expanded to their maximum extent, but still compressed an amount sufficient to provide the necessary auxiliary force for closing the gate in the event line pressure is low. In order to provide a maximum amount of force at this stage with a minimum consumption of space within the bonnet, these springs have a low spring rate. As shown in FIG. 2, when the gate has been moved to fully open position, the coil springs are collapsed and the outer cylindrical member 44 moves into a fully telescoped position with respect to inner cylindrical member 45.

In the assembly of the valve, the cartridge may first be moved into place through the open end of the cylinder 21a and onto the lower wall 21b thereof. The stem 23 may then be passed through the opening within the cylindrical members 44 and 45 to permit the piston 26 to come to rest on the flange 48 of the cartridge. Finally, the cover 29 may be installed and pressure fluid introduced from the conduit 28 into the expansible chamber above the piston 26 so as to compress the springs and move the gate and stem downwardly. This downward movement of the stem will move its lower end beneath the lower side of the bonnet 21, so that the gate 16 may be attached thereto by means of the pin 24, after which the bonnet may be attached to the upper end of the valve body 11. Obviously, the spring cartridge 32 may be removed for replacement or repair by a reversal of this procedure.

As shown in FIGS. 1 and 2, the inner side of each of the flanges 48 and 49 is provided with an annular rib 50 for maintaining the coil springs 33 and 34 separate from one another. As also shown in these figures, the flanges are held against outward movement from the cylindrical members by means of snap rings 51 or the like, the precompression of the springs 33 and 34 maintaining the flanges against the snap rings. For emergency purposes, there is a plug 52 in a port in the lower end of the cylinder 21a through which fluid may be introduced for expanding the spring cartridge and moving the piston 26 upwardly so as to close the valve.

There is also a manually operable means contained within an upwardly extending portion of the cover 29 of the bonnet which permits the piston 26 to be moved downwardly and the spring cartridge to be collapsed in order to open the gate. This may be required when, for example, there has been a failure due to a break in the tubing 28 and it is nevertheless desired to reopen the valve. The details of this additional means for opening the valve are shown and will be described in connection with FIGS. 4 and 5.

With reference now to the valve embodiment of these latter figures, it will be understood that many of the parts including those within the valve body (not shown) may be identical to those shown in the valve of FIGS. 1 and 2. Thus, as shown in FIG. 4, the upper end of the gate 16 is releasably attached to the lower end of the stem 22 by means of a pin 24 and there is a seal ring 27 carried about the stem for sliding within the opening 23 in the lower end of the bonnet which connects the upper end of the cavity in the valve body with the cylinder 21a in the bonnet 21. Thus, and again as described in connection with the valve of FIGS. 1 to 3, there are a pair of expansible chambers within the bonnet 21, the upper of which is disposed between the lower side of cover 29 and the upper side of piston 26, and the lower of which is formed between the lower side of the piston 26 and the bottom wall of the cylinder.

In this second embodiment of the valve of this invention, however, the auxiliary force for closing the gate upon failure of the source of fluid supplied through tubing 28 comprises a gas spring in the form of a bag 53 which is doughnut shaped and filled with gas so as to surround the stem 22 and substantially fill the chamber beneath the piston 26 in the expanded position of same wherein the gate is in closed position. More particularly, the bag has rounded corners 54 at its upper end adjacent the piston 26, and there is a relatively heavy liquid 55 which fills the voids about the bag so as to maintain its shape and prevent its corners from being pinched or otherwise damaged as the piston 26 moves up and down.

When the gate and stem piston 26 are moved downwardly to open position, the gas in the bag 53 is compressed so that the latter will assume the shape shown in FIG. 5 wherein an intermediate portion 56 will fold inwardly, the voids formed by the folds being filled with the liquid 55. As in the case of the coil spring cartridge of the valves of FIGS. 1 and 2, the bag is filled with gas at such pressure that it will provide sufficient force in the expanded position of FIG. 4 for insuring full closing movement of the gate, even though the line pressure acting across the piston seal 27 is relatively low.

The lower end of the bag 53 is closed by an annular plate 57 of relatively rigid material and there is a valve stem 58 in the plate which extends through an opening 59 on the bottom wall 21b of the cylinder of the bonnet 21. The bag is installed in the bonnet while deflated and then filled from an external source of gas by means of the stem 58, the outer end of which is protected by means of a cap 60 removably attached to the bonnet.

The means for manually moving the valve down to open position comprises a threaded rod 61 rotatably received within an upward extension 62 of the cover 29 and having an outwardly extending part 63 with a noncircular head for imparting rotation thereto by means of any suitable tool. The lower end of the rod 61 is threadedly connected to a sleeve 64 which is in turn received within a threaded opening 65 through the cap 29. Upon rotation of the rod 61 in one direction, the sleeve 64 will be caused to move downwardly and to bear at its lower end on the upper end of the piston 26, thereby moving the stem and gate downwardly to open position. On the other hand, when it is desired to close the valve, the rod need only be rotated in the opposite direction to retract the sleeve 64 into the position shown in FIG. 4, whereby the piston and stem are free to move upwardly so as to close the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a body having a flowway therethrough and a cavity intersecting the flowway, a solid slab gate having a port therethrough and being movable within the body cavity for opening and closing the flowway, means about the flowway for sealing with opposite sides of the gate, a reciprocable stem extending sealably through the body into the cavity and connected to the gate for moving the gate between its opened and closed positions, means on the body for urging the stem in a direction toward the flowway so as to move the gate to one of said positions, and an auxiliary valve in the gate having a chamber, passageways connecting opposite ends of the chamber with the flowway on opposite sides of the gate during that portion of the movement of the gate in which a solid portion of said gate is across the flowway to close same, a seat about each of said passageways in the chamber, additional passageways connecting the chamber intermediate the seats with the port in the gate and with the body cavity, and a valve member shiftable in the chamber between said seats for closing one or the other of the first-mentioned passageways.

2. A valve gate, comprising a one piece body having a port therethrough connecting its opposite sides for unobstructed flow of fluids, an adjacent substantial solid portion, and means at one end for connection to a valve stem, and an auxiliary valve in said solid portion of the body, said auxiliary valve having a chamber, passageways connecting opposite ends of the chamber with opposite sides of the body, a seat about each of the passageways in the chamber, a valve member shiftable in the chamber between said seats for closing one or the other of said passageways, and additional passageways connecting the chamber intermediate the seats with the port in the body and the opposite end of the body, respectively.

References Cited by the Examiner

UNITED STATES PATENTS

| | | | |
|---|---|---|---|
| 930,860 | 8/1909 | Horridge | 251—62 |
| 1,475,049 | 11/1923 | Church | 267—65 |
| 2,287,326 | 6/1942 | Reeves et al. | 267—1 X |
| 2,352,351 | 6/1944 | Thornhill | 267—64 |
| 2,375,410 | 5/1945 | Gondek et al. | 137—490 |
| 2,565,475 | 8/1951 | Cox | 251—327 |
| 2,718,233 | 9/1955 | Krummel et al. | 137—119 |
| 2,974,677 | 3/1961 | Natho | 251—62 X |
| 2,991,042 | 7/1961 | Natho | 251—62 X |
| 3,014,711 | 12/1961 | Delvaux | 267—1 |
| 3,017,158 | 1/1962 | Hansen et al. | 251—327 X |
| 3,109,449 | 11/1963 | Flagg | 251—337 |
| 3,123,090 | 3/1964 | Bredtschneider | 251—327 X |

ISADOR WEIL, *Primary Examiner.*

WILLIAM F. O'DEA, *Examiner.*